Patented Sept. 29, 1936

2,055,475

UNITED STATES PATENT OFFICE 2,055,475

TREATMENT OF FLUID

Abraham Sidney Behrman, Chicago, Ill.

No Drawing. Application May 5, 1930, Serial No. 450,060

8 Claims. (Cl. 210—23)

This invention relates to the treatment of fluids for modification or removal of substances carried in them, and to a new material and the method of preparing same for such and other uses.

A general object of the invention is the provision of a new material having characteristics qualifying it for industrial use in the oxidation, sterilization or modification of fluids or of substances carried in them in suspension or solution.

Another object is the provision of a method for treatment of fluids for oxidation, sterilization or modification of them or their components.

Still another object is the provision of a material and method for the separation and recovery of solutes by oxidation.

Another object is the provision of a method for the separation of oxidizing agents from fluids.

Still another object is the provision of a new oxidizing material susceptible of regeneration.

Other and further objects will be pointed out or indicated hereinafter or will be apparent to one skilled in the art upon an understanding of the invention.

It is in many instances desirable to separate or convert various oxidizable substances which are carried in solution or in suspension in different fluids. This may be desirable for the purpose of freeing the fluid from such substances or for the recovery of the substances themselves. For example, it may be desirable to free water from iron or manganese carried in solution, or to subject it to sterilizing treatment for the purpose of killing or incapacitating bacteria or other micro-organisms which it may carry. Procedures heretofore employed for such purposes, in the treatment of water on a commercial or industrial scale for example, involve the dosing of the water, as with coagulants, precipitants and bactericidal agents, as practiced for example in the aluminum sulphate, lime and soda, and chlorination methods. In these various dosing procedures, the success of the treatment and the proper condition of the water are dependent upon accuracy in the dosing and treatment, which accuracy it is difficult to maintain. By utilization of the present invention, all uncertainties in and necessity for accurate dosage control are obviated.

Described generally, the present invention comprises a new treating material consisting of activated carbon having an adsorbed oxidizing agent. The invention also comprises a method of forming such treating material by adsorption of an oxidizing agent in activated carbon from aqueous solution. I have found that by such method a high concentration of oxidizing agent may be obtained in the material, such as to render it highly effective, and that the material is qualified to retain its effectiveness for extended periods even when in contact with liquids. The material may be of granular, pulverulent or other form adapting it for suitable intimacy of contact with the fluids or other substances which are to be treated. This material, suitably prepared with an oxidizing agent selected with reference to the contemplated use or substance to be treated, will react effectively with the contemplated oxidizable substances carried in solution or in suspension in a fluid subjected to contact with the treating material. Depending on the nature of the oxidizable substance in the fluid, it may unite with the treating material, and thus be removed from the fluid, or it may remain in the fluid in its oxidized condition. Depending upon the nature of the oxidizing agent used in the preparation of the treating material, the latter may have sterilizing or bactericidal powers effective to kill or incapacitate micro-organisms in the treated fluid, or other powers effective to modify substances contained in the treated fluid.

A more detailed understanding of the invention may be had from the following specific examples, which are presented merely by way of illustration, as they do not exhaust the range of particular applications of the invention.

The activated carbon used for preparation of the treating material may be of various kinds now known. I have found an activated carbon or char made from Texas lignites, and marketed under the trade-name "Darco", to prove generally effective and satisfactory. I have found that in its fresh and activated condition, and in granular or pulverulent form, this material will adsorb quantities of a number of oxidizing agents from aqueous solution, and with its adsorbed content or loading or charge of the oxidizing agent so acquired, will react subsequently with oxidizable or other substances carried in fluids, either in solution or in suspension and will retain this power over an extended period of use in treatment of liquids as well as gases. For example, for preparation of the treating material, a tenth-normal solution of potassium permanganate may be percolated through a bed of the activated carbon in such quantity that the carbon will acquire by adsorption an effective charge or loading of the oxidizing agent. In the concentration indicated, the solution may be entirely decolorized and freed from the permanganate. The treating material thus formed may be utilized for removal of iron and manganese solutes from water by percolating the water through a bed of the material. This may be carried on in a closed system, so that a pressure head may be maintained on the treated water. The treating material may be regenerated periodically with a fresh solution of potassium permanganate, with or without a preliminary removal of acquired manganese and iron compounds by appropriate solvents.

By way of further example, a demonstration of the effectiveness of the treating material just referred to may be made by passing through a bed of the same an acid solution of ferrous sulphate, whereupon it will be observed that the ferrous solute is oxidized to the ferric form, as evidenced by a change in color of the solution from blue to brown, and which may be confirmed by suitable chemical analytical tests.

By way of further example, a treating material may be prepared by adsorption in activated carbon of potassium dichromate from aqueous solution, and upon the passing of a sulfuric acid-ethyl alcohol mixture through a bed of this material, there is an apparent conversion of the ethyl alcohol to acetaldehyde.

As a further example of a treating material which may be employed for sterilizing effect, activated carbon may be charged with a bactericidal oxidizing agent, such as iodine, by adsorption from a suitable aqueous solution. Such material possesses distinct germicidal powers, and micro-organisms contained in the fluid subjected to contact with the material will be killed or incapacitated by its action. As a variant of such procedure for sterilization of a liquid, water for example, the water may be subjected to pretreatment with iodine in a concentration such as to effect sterilization, and the treated water, after the desired contact period, may then be passed through a bed of activated carbon, wherein the iodine is removed from the water by adsorption.

In like fashion, by appropriate selection of the oxidizing agent for preparation of the treating material, the invention may be applied to the treatment of other various particular fluids and solutions. For example, to remove excess alkalinity from water, a treating material may be prepared by adsorption of an oxidizing agent which is also an acid (e. g. nitric acid) in activated carbon, and the alkaline water passed through a bed of such material. Thus water which has been subjected to softening treatment by the lime-and-soda process may be freed of its residual alkalinity. Tests have indicated that regardless of the initial alkalinity of the water, it may be effectively neutralized by this treatment.

In certain industrial processes it is desirable to free a gas from impurities which are reducing agents, sulphur dioxide, for example. My treating material and process may be employed to effect such result. By preparing the material by adsorption of potassium permanganate in activated carbon from a solution, and passing a gas containing sulphur dioxide through a bed of such material suitably moistened, large volumes of the sulphur dioxide may be removed through oxidation of the sulphur dioxide to sulphur trioxide.

In instances where the oxidizable material from the treated fluid unites with the treating material, it may be recovered from the same by appropriate treatment.

It is to be observed that an inherent advantage of the present invention results from the fact that it involves no proportioning of the oxidizing agent to the material treated. Although the actual amount of oxidizing agent actually present may be greatly in excess of the requirements of the oxidizable material or fluid in contact with the treating material at any instant, such excess does not become an addition to the treated fluid, the amount supplied to the reaction being automatically correct and controlled by the reducing capacity of the substances which are present and which it is desired to oxidize. Hence there is no possibility for overdosage under any circumstances, or of insufficient dosage so long as the treating material retains its oxidizing power. Although, in the course of use, the oxidizing effectiveness of the material may become reduced, the material may be regenerated to restore that power by retreatment with the oxidizing agent and, if necessary, by reactivation as a preliminary to such additional adsorption of the latter.

What I claim is:

1. A process for the treatment of a fluid containing a sulfurous reducing agent, which comprises submitting the fluid containing said sulfurous reducing agent to contact with carbon containing substantial quantities of an adsorbed non-gaseous oxidizing agent, whereby to effect a reaction between said sulfurous reducing agent and said oxidizing agent.

2. A process for sterilizing an aqueous liquid, which comprises contacting the liquid with carbon carrying a substantial quantity of adsorbed iodine.

3. A process for purifying fluids, which comprises contacting said fluids with carbon carrying a substantial quantity of adsorbed iodine.

4. A process for treating a liquid containing a substance which will react with a water-soluble oxidizing agent, which comprises contacting the liquid with a water-soluble oxidizing agent adsorbed in adsorptive carbon.

5. A process for treating a liquid containing a reducing substance with a water-soluble oxidizing agent capable of reacting therewith, which comprises contacting a water solution of said oxidizing agent with adsorbent carbon to the extent necessary to absorb a quantity of said oxidizing agent and to reduce the concentration of said oxidizing agent in said solution, removing said carbon from contact with said solution, and then contacting the carbon containing said adsorbed oxidizing agent with the liquid to be treated to liberate said oxidizing agent only to the extent necessary for the reaction with said reducing substance.

6. A process for treating a liquid containing dissolved substances capable of being oxidized, which comprises adsorbing a substantial quantity of a non-gaseous oxidizing agent in carbon and from an aqueous medium, and contacting said liquid with said carbon to effect a reaction between the oxidizable substance dissolved therein and the oxidizing agent adsorbed in the carbon, thereby removing from the carbon the amount of oxidizing agent entering into the reaction without physically displacing from the carbon the portions of said oxidizing agent not entering into the reaction.

7. The process which comprises adding to a liquid an undetermined amount of a reducing agent soluble therein, and then contacting said liquid with carbon carrying a substantial quantity of an adsorbed water-soluble oxidizing agent, said quantity being in excess of that required for reaction with the reducing compounds in the said liquid, whereby to react the reducing agent in said liquid with the adsorbed oxidizing agent in the carbon to remove from the carbon the amount of the oxidizing agent entering into the reaction without physically displacing from the carbon the portion of said oxidizing agent which does not enter into the reaction.

8. The method of treating a liquid containing a dissolved quantity of an organic compound capable of being oxidized, which comprises contacting said liquid with carbon containing a substantial quantity of a water-soluble adsorbed non-gaseous oxidizing agent to produce a reaction between said organic compound and said oxidizing agent and to remove from the carbon only the amount of said oxidizing agent necessary for said reaction.

ABRAHAM SIDNEY BEHRMAN.